(12) United States Patent
Vedantham et al.

(10) Patent No.: US 11,765,040 B2
(45) Date of Patent: *Sep. 19, 2023

(54) ADVANCED SWITCH NODE SELECTION FOR POWER LINE COMMUNICATIONS NETWORK

(71) Applicant: TEXAS INSTRUMENTS INCORPORATED, Dallas, TX (US)

(72) Inventors: Ramanuja Vedantham, Allen, TX (US); Kumaran Vijayasankar, Dallas, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,968

(22) Filed: Nov. 9, 2021

(65) Prior Publication Data

US 2022/0070064 A1 Mar. 3, 2022

Related U.S. Application Data

(63) Continuation of application No. 16/812,670, filed on Mar. 9, 2020, now abandoned, which is a
(Continued)

(51) Int. Cl.
*H04L 41/12* (2022.01)
*H04B 3/54* (2006.01)
*H04B 3/00* (2006.01)
*H04B 3/46* (2015.01)

(52) U.S. Cl.
CPC ............ *H04L 41/12* (2013.01); *H04B 3/00* (2013.01); *H04B 3/46* (2013.01); *H04B 3/544* (2013.01)

(58) Field of Classification Search
CPC .. H04L 41/12; H04B 3/00; H04B 3/46; H04B 3/544
(Continued)

(56) References Cited

U.S. PATENT DOCUMENTS

| | | | |
|---|---|---|---|
| 7,069,033 | B1 | 6/2006 | Moon et al. |
| 8,948,043 | B2 | 2/2015 | Gerber et al. |

(Continued)

FOREIGN PATENT DOCUMENTS

| | | | | |
|---|---|---|---|---|
| CN | 102612110 A | | 7/2012 | |
| GB | 2484142 | * | 4/2012 | ............... H04B 3/54 |

OTHER PUBLICATIONS

Lu et al., "Implementing PRIME for Robust and Reliable Power Line Communication (PLC)," Texas Instruments, Jul. 2013, 9 pages.
(Continued)

*Primary Examiner* — Christopher R Crompton
(74) *Attorney, Agent, or Firm* — Krista Y. Chan; Frank D. Cimino

(57) ABSTRACT

An algorithm for the promotion of terminal nodes to switch nodes in a PLC network reduces overall network overhead and collisions, while ensuring the appropriate selection of a switch node and minimizing the number of levels in a PLC network. It also ensures that the terminal nodes with appropriate signal-to-noise ratios (SNRs) are promoted. It is desirable to have a network with fewer levels. The disclosed approach favors the nodes that are closer to the DC to promote them as switch nodes. This is achieved by waiting for a smaller number of PNPDUs for a node that is closer to the DC in comparison to a node that is farther away from the DC.

20 Claims, 3 Drawing Sheets

Related U.S. Application Data continuation of application No. 15/050,163, filed on Feb. 22, 2016, now Pat. No. 10,587,476, which is a continuation of application No. 13/620,829, filed on Sep. 15, 2012, now Pat. No. 9,270,334.

(58) Field of Classification Search
USPC .......................................................... 375/257
See application file for complete search history.

(56) References Cited

U.S. PATENT DOCUMENTS

| | | | |
|---|---|---|---|
| 9,264,103 B2* | 2/2016 | Vijayasankar | H04B 3/542 |
| 9,270,334 B2* | 2/2016 | Vedantham | H04B 3/46 |
| 9,438,309 B2* | 9/2016 | Vijayasankar | H04B 3/54 |
| 10,587,476 B2* | 3/2020 | Vedantham | H04B 3/00 |
| 2009/0185508 A1 | 7/2009 | Duke et al. | |
| 2010/0075612 A1 | 3/2010 | Oi et al. | |
| 2012/0147899 A1* | 6/2012 | Du | H04L 12/413 370/447 |
| 2013/0170336 A1* | 7/2013 | Chen | H04L 41/12 370/256 |

OTHER PUBLICATIONS

Brunschweiler et al., "Physical Test Facilities and Report on These Facilities," Open Meter, Version 1.0, Aug. 3, 2012, 84 pages.
Ankou et al., "Draft Specification for PowerLine Intelligent Metering Evolution", PRIME Alliance, 1.3.6., May 2012, 251 pages.

* cited by examiner

ADVANCED SWITCH NODE SELECTION FOR POWER LINE COMMUNICATIONS NETWORK

CROSS-REFERENCE TO RELATED APPLICATIONS

This application is a continuation of U.S. patent application Ser. No. 16/812,670, filed Mar. 9, 2020, which is a continuation of U.S. patent application Ser. No. 15/050,163, filed Feb. 22, 2016, now U.S. Pat. No. 10,587,476, which is a continuation of U.S. patent application Ser. No. 13/620,829, filed Sep. 15, 2012, now U.S. Pat. No. 9,270,334, each of which is herein incorporated by reference in its entirety.

FIELD

The present invention relates generally to power line communication networks, and more specifically to promoting a terminal node to a switch node.

BACKGROUND

Power line communication or power line carrier (PLC) is a system for carrying data on a conductor also used for electric power transmission. A wide range of power line communication technologies are needed for different applications, ranging from home automation to Internet access.

Electrical power is transmitted over long distances using high voltage transmission lines, distributed over medium voltages, and used inside buildings at lower voltages. Hence, electrical power grids allow for relatively low cost communication over long distances. Full- and half-duplex systems (both one-way and two-way systems) have been successfully used for decades for purposes such as automatic remote meter readings.

Power line communications systems operate by impressing a modulated carrier signal on a wiring system. Different types of power line communications use different frequency bands, depending on the signal transmission characteristics of the power wiring used. Since the power distribution system was originally intended for transmission of AC power at typical frequencies of 50 Hz or 60 Hz, power wire circuits have only a limited ability to carry higher frequencies. The propagation problem is a limiting factor for each type of power line communications. Data rates and distance limits vary widely over many power line communication standards. Low frequency (about 100-200 kHz) carriers impressed on high-voltage transmission lines may carry one or two analog voice circuits, or telemetry and control circuits with an equivalent data rate of a few hundred bits per second; however, these circuits may be many miles long. Higher data rates generally imply shorter ranges; a local area network operating at millions of bits per second may only cover one floor of an office building, but eliminates the need for installation of dedicated network cabling.

Narrowband power line communications began soon after electrical power supply became widespread. Around the year 1922 the first carrier frequency systems began to operate over high-tension lines with frequencies of 15 to 500 kHz for telemetry purposes, and this continues. Consumer products such as baby alarms have been available at least since 1940. In the 1930's, ripple carrier signaling was introduced on the medium (10-20 kV) and low voltage (240/415 V) distribution systems. For many years, the search continued for a low cost bi-directional technology suitable for applications such as remote meter reading. The EDF (French power utility) prototyped and standardized a system called "spread frequency shift keying" or S-FSK. (See IEC 61334.) This system is now a simple, low-cost system with a long history. However, it has a very slow transmission rate, between 200 and 800 bits per second. In the 1970's, the Tokyo Electric Power Co. ran experiments that reported successful bi-directional operation with several hundred units. Since the mid-1980's, there has been a surge of interest in using the potential of digital communications techniques and digital signal processing. The drive is to produce a reliable system that is cheap enough to be widely installed and able to compete cost effectively with wireless solutions.

Applications of mains communications vary enormously, as would be expected of such a widely available medium. One natural application of narrow band power line communication is the control and telemetry of electrical equipment such as meters, switches, heaters and domestic appliances. A number of active developments are considering such applications from a systems point of view, such as demand side management wherein domestic appliances would intelligently co-ordinate their use of resources, for example limiting peak loads. Control and telemetry applications include both 'utility side' applications, which involve equipment belonging to the utility company up to the domestic meter, and 'consumer-side' applications that involve equipment in the consumer's premises. Possible utility-side applications include automatic meter reading (AMR), dynamic tariff control, load management, load profile recording, credit control, pre-payment, remote connection, fraud detection and network management, and could be extended to include gas and water. A project of EDF, France includes demand management, street lighting control, remote metering and billing, customer specific tariff optimization, contract management, expense estimation and gas applications safety. Many specialized niche applications also exist that use the mains supply within the home as a convenient data link for telemetry. For example, in the UK and Europe a TV audience monitoring system uses power line communications as a convenient data path between devices that monitor TV viewing activity in different rooms in a home and a data concentrator that is connected to a telephone modem.

Several competing organizations have developed specifications, including the HomePlug Powerline Alliance, Universal Power line Association and HD-PLC Alliance. On December 2008, the ITU-T adopted recommendation G.hn/G.9960 as a standard for high-speed power line, coax and phone line communications. The National Energy Marketers Association was also involved in advocating for standards. IEEE P1901 is an IEEE working group developing the global standard for high-speed power line communications. In July 2009, the working group approved its "IEEE 1901 Draft Standard for Broadband over Power Line Networks: Medium Access Control and Physical Layer Specifications" as an IEEE draft standard for broadband over power lines defining medium access control and physical layer specifications. The IEEE 1901 Draft Standard was published by the IEEE in January 2010, and the final standard was approved on 30 Sep. 2010 and published on Feb. 1, 2011. NIST has included IEEE 1901, HomePlug AV and ITU-T G.hn as "Additional Standards Identified by NIST Subject to Further Review" for the smart grid in the United States. PRIME is one of the narrowband PLC technologies that has been widely adopted in Spain by utilities such as Iberdrola and Union Fenosa. Specifically, PRIME PLC system operation is defined in the draft Specification for Power Line Intelligent Metering Evolution incorporated by reference herein.

Increased use of PLC systems has generated the need for regularly obtaining data from all metered points in order to better control and operate the system. Specifically, there is a need for efficient selection of a switch node at the data concentrators, while also ensuring that the best possible node is chosen to be promoted as a switch node.

SUMMARY

Embodiments disclosed herein address the above stated needs by providing an efficient algorithm for optimal switch node selection in PLC systems.

According to one method embodiment, a switch node in a Power Line Communication (PLC) network is selected by initiating, by a new terminal node, a request to join the PLC network, sending, by neighboring terminal nodes to a base node, requests to be promoted to a switch node, and selecting a new optimal switch node by the base node. The selection of the new switch node is determined by a probabilistic algorithm according to a generated random number, and by transmitting a promotion message by the base node to the selected terminal node, which then becomes a new switch node for the new terminal node. The new switch node transmits beacons requesting the new node to join the network.

According to a system embodiment, a system includes a switch node to be selected in a Power Line Communication (PLC) network. The system includes a new terminal node requesting to join the PLC network and a base node having a data concentrator for selection of a new optimal switch node. The selection of the new switch node is determined by a probabilistic algorithm according to a generated random number, and by transmitting a promotion message to the new optical switch node. Neighboring terminal nodes send requests to the base node to be promoted to a switch node and transmitting beacons requesting the new node to join the network.

According to algorithm embodiment, an optimum switch node in a Power Line Communication (PLC) network is selected. The algorithm operates to receive requests at a base node having a data concentrator from terminal nodes asking to be promoted to a switch node to serve a new node trying to join the network. The algorithm verifies, by a terminal node, that there is an acceptable Signal to Noise Ratio (SNR) of a received Promotion Needed Protocol Data Unit (PNPDU) request. The algorithm generates a random number back-off for the purpose of reducing network congestion and transmits, by a terminal node, a Promotion Up process message to the base node based on a probabilistic function according to a delay based on the level of the node and the generated random number multiplied by a level of node PNPDUs.

BRIEF DESCRIPTION OF THE DRAWINGS

In the various figures of the drawing, like reference numbers are used to denote like or similar parts.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An algorithm for reducing overall network overhead while ensuring the appropriate selection of a switch node and minimizing the number of levels in a PLC network is disclosed. The algorithm ensures that traffic overhead is mitigated during the node promotion process. It also ensures that the terminal nodes with appropriate Signal-to-noise ratios (SNRs) are promoted. The algorithm describes the promotion procedure for a terminal node to a switch node.

Figure 1:
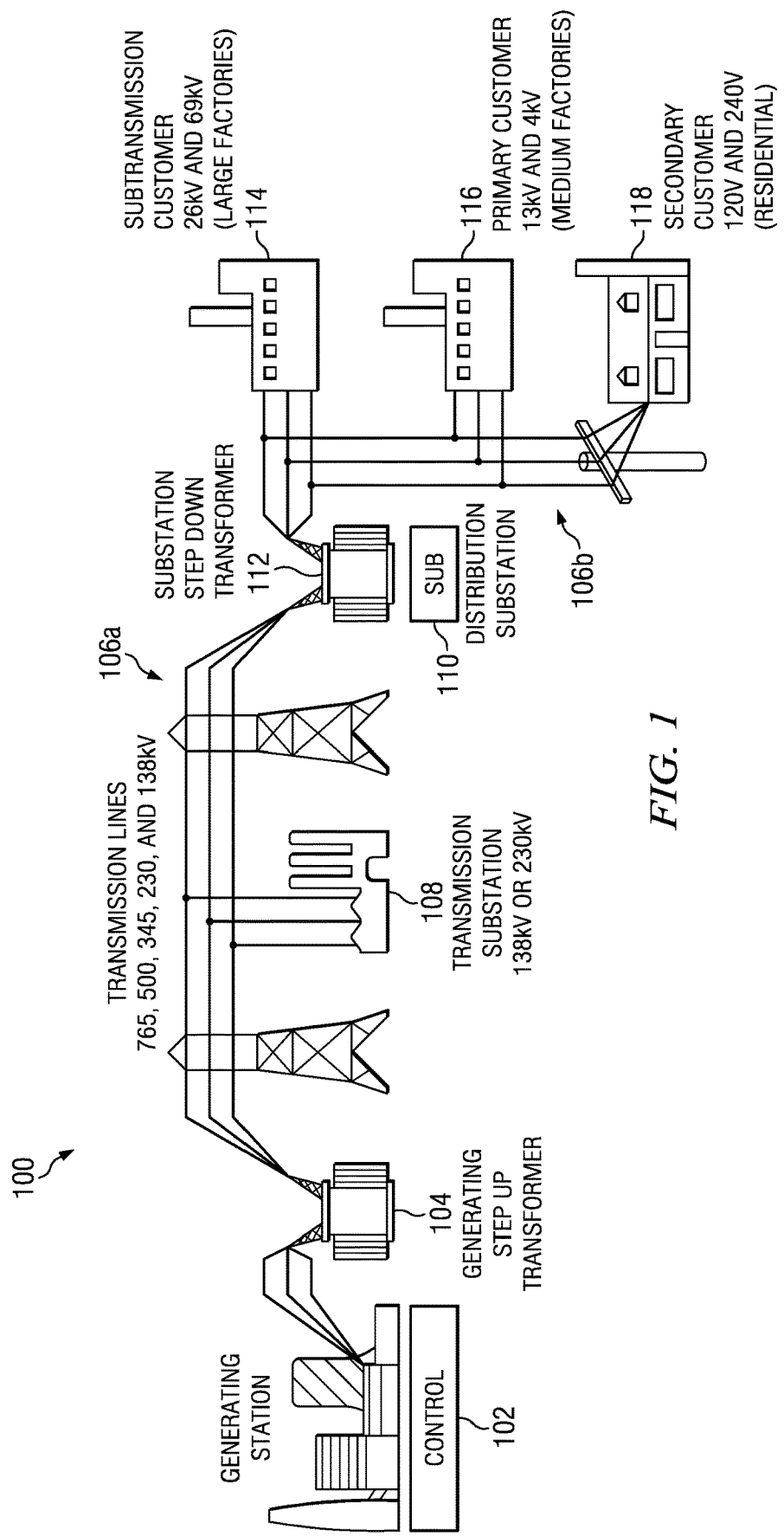
FIG. 1 is a diagram illustrating an example of a power line communication network in which advanced switch node selection can be used.

FIG. 1 is a diagram illustrating an example of a power line communication network 100 in which advanced switch node selection can be used. Electrical power is transmitted from a generating station 102 to a step-up transformer 104 where voltage is increased for transmission over long distances using high voltage transmission lines 106b. Voltages may be increased at the step-up transformer 104 or one or more transmission substations 108 to values between 765 kV-230 kV 138 kV before reaching a distribution substation 110. At the distribution substations 110, voltages may be stepped down using a substation step-down transformer 112 for delivery to customers over distribution transmission lines 106b. For example, 26 kV and 69 kV power may be distributed to a sub-transmission customer 114 such as a large factory. 13 kV power may be distributed to a primary customer such as medium-sized factories. 120 V and 240 V power may be distributed to secondary, or residential, customers. Distribution substations 110 are typically base nodes containing a data concentrator (not shown). Thus, FIG. 1 illustrates an exemplary grid network from the generating station to the consumer that can be used for power-line communication.

Figure 2:
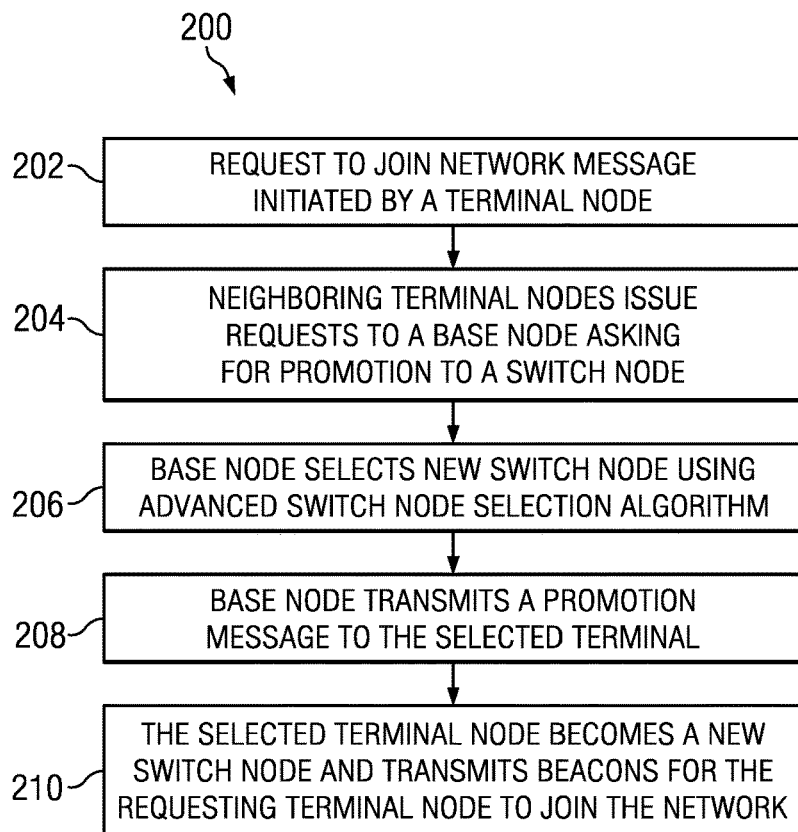
FIG. 2 is an exemplary overview flowchart illustrating advanced switch node selection.

FIG. 2 is an exemplary overview flowchart illustrating advanced switch node selection 200. The advanced switch node algorithm may be detailed in terms of the draft Specification for Power Line Intelligent Metering Evolution. However, one skilled in the art would recognize that the advanced switch node algorithm is applicable to any PLC standard.

When a new terminal node attempts to join the network, it initiates a request message in step 202. For example, in the PRIME standard, a PNPDU (Promotion Needed Protocol Data Unit) request is issued in a data frame if the terminal node cannot detect any beacon from an existing switch node. This data frame essentially requests for a data concentrator or base node (BN), typically located at a distribution substation 110, to promote one of the terminal nodes in the neighborhood of the new terminal node into a switch node.

The PNPDU is a one-hop broadcast, which can potentially be heard by multiple terminal nodes in the neighborhood. In step 204, the neighboring terminal nodes send PROMOTION UP PROCESS (PRO_REQ_S) frames to the BN requesting for that node to be promoted to a switch node to serve the new node trying to join the network in step 204. Control flow proceeds to step 206.

Figure 4:
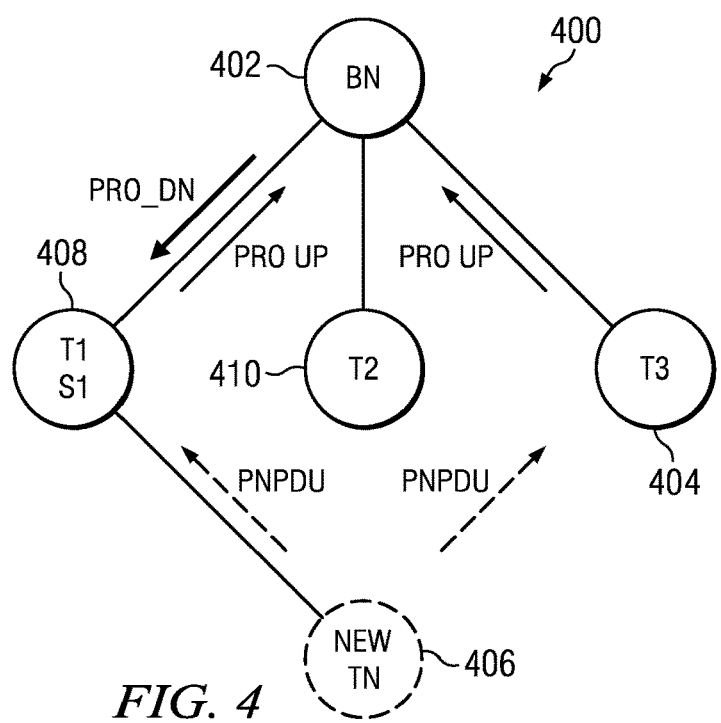
FIG. 4 is a state diagram illustrating an exemplary promotion down selection procedure during advanced switch node selection.
Figure 3:
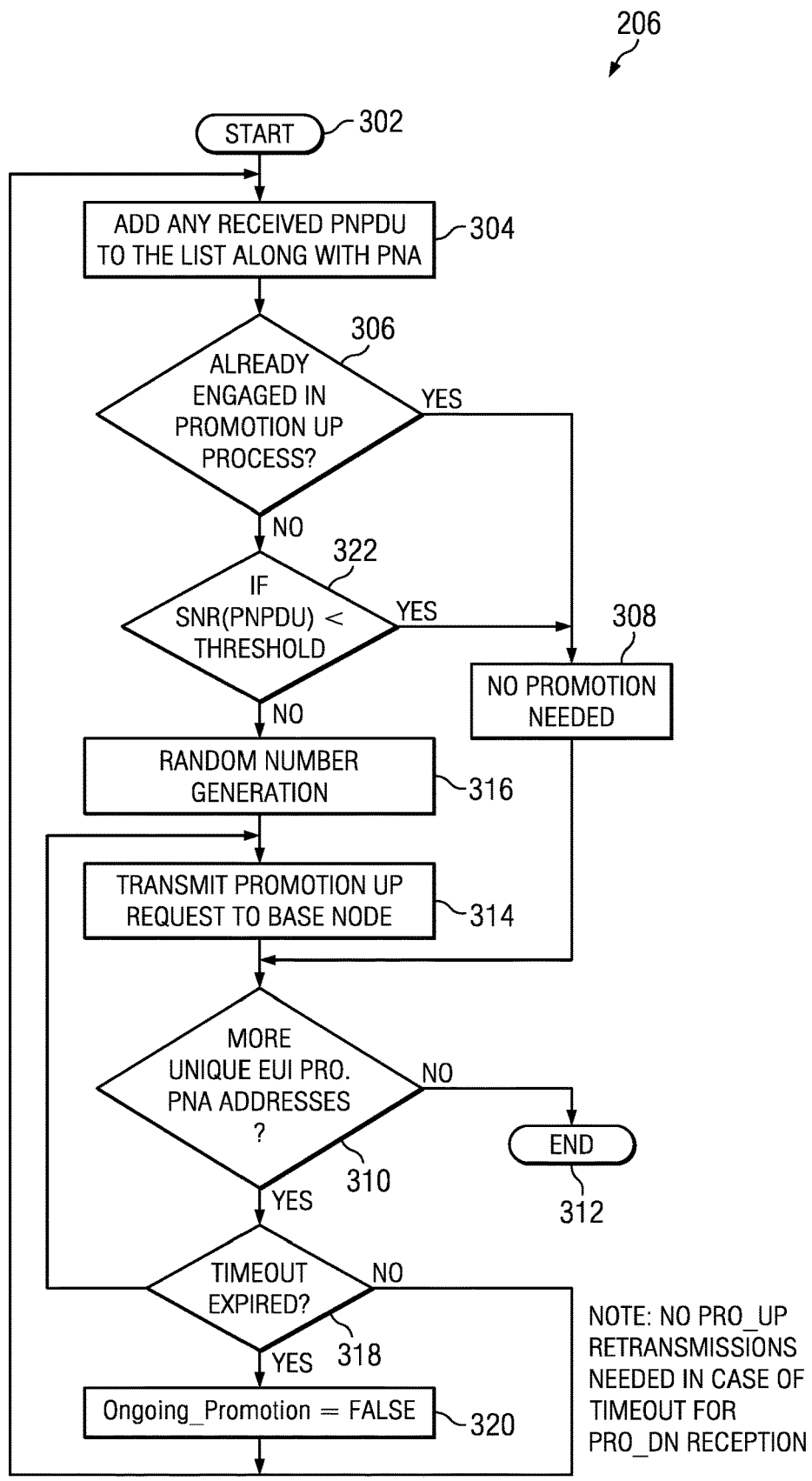
FIG. 3 is a detailed flowchart illustrating an exemplary promotion up transmission procedure during advanced switch node selection.

In step 206, the data concentrator, or base node, will determine the appropriate terminal node that needs to be promoted into a switch node based on a proprietary algorithm comprising promotion up and demotion down procedures detailed in FIGS. 3 and 4 respectively. Control flow proceeds to step 208.

In step 208, the data concentrator transmits a PRO DN (PRO_REQ_B) message to the terminal node to be promoted as a switch node. Control flow proceeds to step 210.

In step 210, the newly promoted switch node transmits beacons for the new terminal node to join the network. In this fashion, the new node can join the network even if it is not able to hear any beacons initially.

FIG. 3 is a detailed flowchart illustrating an exemplary Promotion Up Transmission procedure during advanced switch node selection 206. The Promotion Up Transmission procedure reduces the overall levels in the network as well as the number of switches, while ensuring that the switches are sufficiently robust, having a SNR greater than a predetermined threshold) when communicating with the new node. It also ensures that the traffic overhead during the procedure is mitigated and that the network is stable during the node promotion process.

The promotion up transmission starts in step 302 after the base node receives requests from terminal nodes asking to be promoted to a switch node in order to serve the new node trying to join the network. Control proceeds to step 304.

In step 304, when a terminal node receives a PNPDU, it adds it to a PNPDU list along with the PNA, or extended unique identifier (EUI) address. Control flow proceeds to step 306.

In step 306, if the terminal node is already engaged in a promotion up process for this requesting terminal node or any other requesting terminal node, there is no need to initiate a Promotion Up process and control flow proceeds accordingly to step 308 where no promotion is needed and control flow proceeds to step 310. Otherwise, control flow proceeds to step 322.

In step 322, the terminal node first verifies the SNR of the received PNPDU. If the SNR is below a predetermined threshold (e.g. 10 dB), a promotion up procedure is not performed for this node and control flow proceeds to step 308 where no promotion is needed and control flow proceeds to step 310. Otherwise, the SNR is acceptable for effective communication with the new node and control flow proceeds to step 316.

In step 316, the terminal node first generates a random number for backoff purposes in reducing network congestion. Control flow proceeds to step 314.

In step 314, the terminal node transmits a promotion up process message to the base node based on a probabilistic function according to the random number generated in step 316 and control flow proceeds to step 310. The promotion up request is transmitted according to a delay based on the level of the node after receiving a random number multiplied by the level of node PNPDUs. It is desirable to have a network with fewer levels, and this approach favors the nodes that are closer to the DC to promote them as switch nodes. This is achieved by waiting for a smaller number of PNPDUs for a node that is closer to the DC in comparison to a node that is farther away from the DC.

The promotion up request is generated only after this delay and will be transmitted as per the CSMA/CA procedure in PRIME. Since PNPDUs are generated at a fairly high rate by each node in PRIME, it should be noted that the promotion up process frames do not require any retransmission unlike other control frames because PNPDU generation will automatically trigger multiple transmissions of PRO_REQ_S frames by the same node.

In step 310, the PNPDU list is checked for more unique EUI addresses. If there are no more unique addresses in the list, control flow ends in step 312. Otherwise control flow proceeds to step 318.

In step 318, if a predetermined timeout period has expired, the node can accept any PNPDUs from the same requesting node or any other node to perform the promotion up procedure and control returns to step 304. Otherwise, control flow proceeds to step 320, where the node is waiting for a response from the DC (PRO_REQ_B frame) for any ongoing promotion process, before then returning to step 304.

FIG. 4 is a state diagram illustrating an exemplary promotion down selection procedure 400, or demotion process, of advanced switch node selection. The base node 402 or a switch node (404, 408, 410) may discontinue the switching function of a new node 406 at any time. The demotion mechanism provides this process using a PRO control packet for all demotion transactions. The PRO.NSID field of the PRO control packet contains the SID of the node that is being demoted as part of the demotion transaction. The PRO.PNA field is not used in any demotion process transaction and its contents are not interpreted at either end. Following the successful completion of a demotion process, a switch node shall immediately stop the transmission of beacons and change from a switch functional state to a terminal functional state. The base node may reallocate the SID and beacon slot used by the demoted switch after (macMaxCtlReTx+1)*macCtlReTxTimer seconds to other terminal nodes requesting promotion.

In this manner, an efficient algorithm for promoting switch node, while also ensuring that the best possible node is chosen to be promoted as a switch node is disclosed. All terminal nodes that hear a request message to start the promotion process at the same time are prevented from flooding in the network disrupting the transmission of control (ALV messages) and data (short cycle and long cycle meter read) traffic to the nodes that are already part of the network. Because the promotion requests are spaced out from different nodes within a neighborhood, the procedure allows for lesser traffic and maintains the connectivity in the network and availability for meter reading and other operations.

Those of skill would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Electrical connections, couplings, and connections have been described with respect to various devices or elements. The connections and couplings may be direct or indirect. A connection between a first and second electrical device may be a direct electrical connection or may be an indirect electrical connection. An indirect electrical connection may include interposed elements that may process the signals from the first electrical device to the second electrical device.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. A method comprising:
    receiving, with one or more processors included in a terminal node of a Power Line Communication (PLC) network, a first promotion needed request from a node joining the PLC network, wherein the terminal node is coupled in the PLC network at a level;
    determining a number of promotion needed requests based on the level at which the terminal node is coupled in the PLC network; and
    determining whether to transmit, with the one or more processors, a promotion request based on whether the number of promotion needed requests have been received.

2. The method of claim 1, further comprising:
    generating a random number, wherein the number of promotion needed requests is determined based on the level of the terminal node and the random number.

3. The method of claim 2, wherein the number of promotion needed requests is determined based on the random number multiplied by the level of the terminal node.

4. The method of claim 1, in which the number of promotion needed requests is determined based on a probabilistic algorithm.

5. The method of claim 1, wherein the first promotion needed request and each of the promotion needed requests associated with the number of promotion needed requests are Promotion Needed Protocol Data Unit (PNPDU) requests.

6. The method of claim 1, wherein the promotion request is a PROMOTION UP METHOD (PRO_REQ_S) frame requesting that the terminal node be promoted to a switch node to serve the node joining the network.

7. The method of claim 1 further comprising comparing a signal-to-noise ratio of the first promotion needed request to a threshold, wherein the determining of the number of promotion needed requests and the determining whether to transmit the promotion request are performed based on the signal-to-noise ratio of the promotion needed request satisfying the threshold.

8. The method of claim 1 further comprising:
    receiving a promotion message based on the promotion request; and
    transmitting, by the terminal node, a beacon message to join the node to the PLC network based on the promotion message.

9. A method comprising:
    receiving, with one or more processors included in a terminal node of a Power Line Communication (PLC) network, a promotion needed request from a node joining the PLC network, wherein the terminal node is coupled at a level of the PLC network;
    determining, with the one or more processors, a number of promotion needed requests to wait based on the level of the PLC network at which the terminal node is coupled; and
    determining whether to transmit, with the one or more processors, a promotion request based on whether the number of promotion needed requests has been met.

10. The method of claim 9, further comprising:
    generating a random number, wherein the number of promotion needed requests is determined based on the level of the PLC corresponding to the terminal node and the random number.

11. The method of claim 10, wherein the number of promotion needed requests is determined based on the random number multiplied by the level of the PLC network corresponding to the terminal node.

12. The method of claim 9, in which the number of promotion needed requests is determined based on a probabilistic algorithm.

13. The method of claim 9, wherein the promotion needed request and each promotion needed request of the number of promotion needed requests are Promotion Needed Protocol Data Unit (PNPDU) requests.

14. The method of claim 9, wherein the promotion request is a PROMOTION UP PROCESS (PRO_REQ_S) frame requesting that the terminal node be promoted to a switch node to serve the node joining the network.

15. A method comprising:
receiving, by a first node, a request from a second node, wherein:
the first node is connected in a power line communication (PLC) network at a level of the PLC network; and
the request is transmitted by the second node to join the PLC network;
determining, by the first node, that a signal-to-noise ratio of the request complies with a threshold; and
in response to the determining that the signal-to-noise ratio of the request complies with the threshold:
determining a number of subsequent requests to delay based on the level at which the first node is connected in the PLC network; and
determining whether to transmit, by the first node, a promotion request based on whether the number of subsequent requests have been received.

16. The method of claim 15, wherein the request requests that the first node be promoted to a switch node.

17. The method of claim 15, wherein the number of subsequent requests to delay is based on a random number multiplied by the level at which the first node is connected to the PLC network.

18. The method of claim 15, wherein the request includes a Promotion Needed Protocol Data Unit (PNPDU) request.

19. The method of claim 18, wherein each request of the number of subsequent requests is a PNPDU request.

20. The method of claim 15 further comprising:
receiving, by the first node, a promotion message based on the promotion request; and
joining, by the first node, the second node to the PLC network based on the promotion message.

* * * * *